US005597642A

United States Patent [19]

Schleinz et al.

[11] Patent Number: 5,597,642

[45] Date of Patent: Jan. 28, 1997

[54] DUAL SUBSTRATE, SINGLE-PASS PRINTING PROCESS AND SUBSTRATES PRINTED THEREBY

[75] Inventors: Robert J. Schleinz, Appleton, Wis.; Daniel J. Conrad, Murfreesboro, Tenn.; Joseph S. Kucherovsky, Philadelphia, Pa.

[73] Assignee: Kimberly-Clark Corporation, Neenah, Wis.

[21] Appl. No.: 440,430

[22] Filed: May 12, 1995

Related U.S. Application Data

[62] Division of Ser. No. 347,983, Dec. 2, 1994, Pat. No. 5,501,149.

[51] Int. Cl.[6] .......... B32B 9/00

[52] U.S. Cl. .......... 428/195; 428/36.1; 428/36.8; 428/204; 428/206; 428/207; 428/211; 428/321.3; 428/340; 428/423.1; 428/511; 101/178; 101/219; 101/223; 101/228; 101/181; 101/416.1; 101/423

[58] Field of Search .......... 428/36.1, 36.8, 428/195, 340, 321.3, 511, 290, 211, 423.7, 204, 207, 206; 101/178, 423, 228, 416.1, 181, 219, 223

[56] References Cited

U.S. PATENT DOCUMENTS

| | | | |
|---|---|---|---|
| H1376 | 11/1994 | Osborn, III et al. | 604/361 |
| 364,029 | 5/1887 | Macnab . | |
| 429,891 | 6/1890 | Crowell | 101/223 |
| 1,592,065 | 7/1926 | Barber . | |
| 1,639,218 | 8/1927 | Ebersol | 101/416.1 |
| 2,099,879 | 11/1938 | Wooddell | 101/420 |
| 2,111,613 | 5/1936 | Bulford | 101/178 |
| 2,175,051 | 10/1939 | Bromley | 101/178 |
| 2,378,444 | 6/1945 | Smith et al. | 101/178 |
| 2,404,350 | 7/1946 | Carlsen et al. | 101/423 |
| 2,504,021 | 4/1950 | Heinrich | 101/130 |
| 2,743,206 | 4/1956 | Verduin | 154/54.5 |
| 3,306,194 | 2/1967 | Cutri | 101/131 |
| 3,306,196 | 2/1967 | Cutri | 101/132.5 |
| 3,442,211 | 5/1969 | Beacham | 101/416 |
| 3,518,940 | 7/1970 | Stroud et al. | 101/223 |
| 3,978,789 | 9/1976 | Fennekels et al. | 101/211 |
| 4,063,505 | 12/1977 | Sasamoto et al. | 101/228 |
| 4,069,822 | 1/1978 | Buell | 128/294 |
| 4,147,580 | 4/1979 | Buell | 156/291 |
| 4,218,973 | 8/1980 | Bouffard et al. | 101/181 |
| 4,232,076 | 11/1980 | Stetson et al. | 428/158 |
| 4,281,598 | 8/1981 | Rump | 101/470 |
| 4,340,212 | 7/1982 | Simson | 270/5 |
| 4,501,072 | 2/1985 | Jacobi, Jr. et al. | 34/1 |
| 4,672,893 | 6/1987 | Mammarella, Jr. | 101/170 |
| 4,720,415 | 1/1988 | Vander Wielen et al. | 428/152 |
| 4,824,503 | 4/1989 | Wilen | 156/204 |
| 4,940,464 | 7/1990 | Van Gompel et al. | 604/396 |
| 4,965,122 | 10/1990 | Morman | 428/225 |
| 4,967,660 | 11/1990 | Yamanari et al. | 101/229 |
| 4,981,747 | 1/1991 | Morman | 428/198 |
| 5,086,700 | 2/1992 | Van Den Berg | 101/424.1 |
| 5,114,781 | 5/1992 | Morman | 428/198 |
| 5,116,662 | 5/1992 | Morman | 428/198 |
| 5,160,505 | 11/1992 | Seveno et al. | 8/471 |

(List continued on next page.)

FOREIGN PATENT DOCUMENTS 714250 11/1931 France .

OTHER PUBLICATIONS

USSN 08/338,986 to R. J. Schleinz et al., entitled "Ink-Printed, Low Basis Weight Nonwoven Fibrous Webs And Method" filed Nov. 14, 1994.

*Primary Examiner*—Patrick Ryan
*Assistant Examiner*—Abraham Bahta
*Attorney, Agent, or Firm*—Douglas L. Miller

[57] ABSTRACT

A dual substrate, single-pass printing process prints a high basis weight substrate and a low basis weight substrate. Ink striking through the low basis weight substrate is collected and absorbed by the high basis weight substrate. The printed substrates are then separated and rewound for subsequent transport and handling.

13 Claims, 2 Drawing Sheets

U.S. PATENT DOCUMENTS

| | | | |
|---|---|---|---|
| 5,214,442 | 5/1993 | Roller | 346/1.1 |
| 5,226,992 | 7/1993 | Morman | 156/62.4 |
| 5,275,103 | 1/1994 | Hahne | 101/488 |
| 5,320,891 | 6/1994 | Levy et al. | 428/108 |
| 5,336,545 | 8/1994 | Morman | 428/152 |
| 5,407,708 | 4/1995 | Lovin et al. | 427/493 |
| 5,456,176 | 10/1995 | Strasser | 101/219 |
| 5,458,590 | 10/1995 | Schleinz et al. | 604/361 |

DUAL SUBSTRATE, SINGLE-PASS PRINTING PROCESS AND SUBSTRATES PRINTED THEREBY

This is a divisional application of application U.S. Ser. No. 08/347,983, filed on Dec. 2, 1994, now U.S. Pat. No. 5,501,149.

BACKGROUND OF THE INVENTION

The present invention pertains to a process for printing substrates and substrates printed thereby, and more particularly to a dual substrate, single-pass printing process and substrates printed thereby.

The ink printing of fabrics, such as woven and nonwoven fabrics, with various patterns and colors is well known. These printed fabrics are then incorporated into various products, such as personal care products. Examples of personal care products include diapers, training pants, incontinence products, and the like. The printed fabrics are primarily intended to aesthetically enhance the appearance of the products.

One problem with current ink printing processes is that the ink or inks can run through, i.e., strikethrough, the fabric, and particularly a low basis weight fabric. Low basis weight fabrics are generally thin, and inherently include a large number of small voids, or a smaller number of larger voids, through which the ink can strike through. The problem with ink strikethrough is that the ink builds up on, for example, an impression cylinder of the printing apparatus. This ink buildup on the impression cylinder results in poor print quality on the fabric, the transfer of ink to the back of the fabric, and poor operating efficiency due to machinery down time required to remove the ink buildup.

This problem becomes even more significant in high speed printing environments, where the ink buildup is accelerated and increases the number of times the machinery needs to be shut down for removal of the buildup. As the shut down times increase, so do waste of material and ink associated with machinery start-up.

One attempt to resolve ink buildup is the use of doctor blades on an impression roll or the like. Although doctor blades remove ink buildup while machinery is operating, their use prematurely wears out the surface of the cylinder or roll supporting the fabric. This, in turn, results in increased costs due to replacing prematurely worn out equipment. Another attempt to eliminate ink buildup is to run a layer of material between the fabric and print rollers. The layer is designed to collect or absorb ink strikethrough and carry it away. This has proved to be costly, since either the layer must be replaced with a new layer, or the layer must be cleaned of the ink before being rerun through the printing apparatus.

In one form of the present invention, there is provided a printed substrate made by the process including providing a continuously moving first substrate, moving the first substrate to an ink printing station comprising at least two ink printing cylinders, printing a pattern on the first substrate with one of the two ink printing cylinders, then introducing a continuously moving second substrate between the first substrate and the other of the ink printing cylinders, printing a pattern on the second substrate with the other of the ink printing cylinders, and collecting ink striking through the second substrate onto the first substrate.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

In many prior art processes for printing a substrate, portions of the ink applied to the substrate can pass through the substrate and become deposited on the surface of, for example, an impression cylinder. This is termed "strikethrough" and causes ink buildup on the impression cylinder. It is this strikethrough and ink buildup that results in poor print quality on the substrate, the transfer of ink to the back surface of the substrate, and poor operating efficiency due to machinery down time required to remove the ink buildup. Moreover, ink strikethrough causes various undesirable graphic effects on the substrate, such as the smearing of colors, blurring of the pattern, misregistration, or the like. These undesirable effects are not pleasing to the consumer, and tend to cause a perception of poor product quality and performance.

Figure 1:
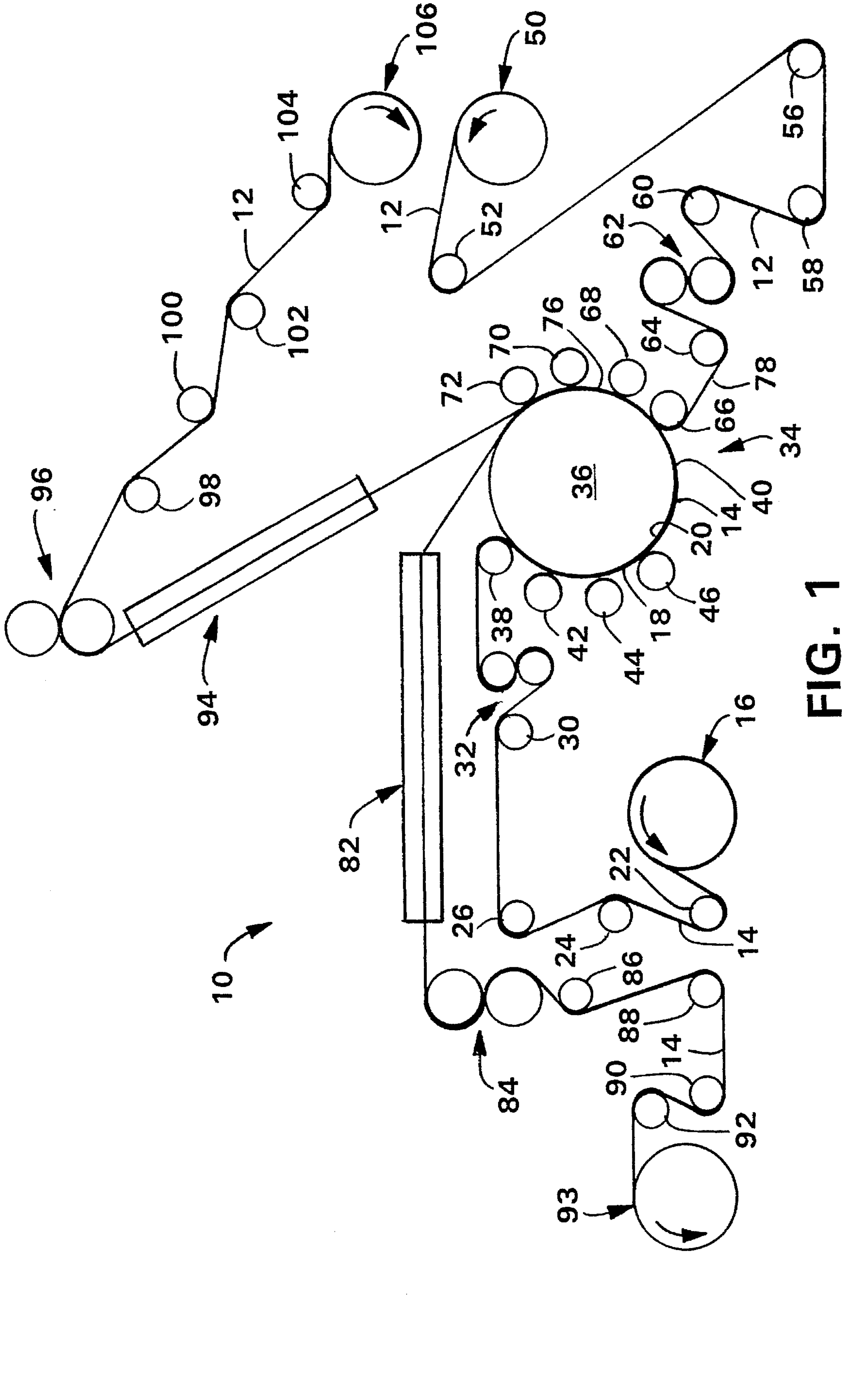
FIG. 1 illustrates schematically one apparatus operated in accordance with the principles of the present invention.

Referring to FIG. 1, there is illustrated an apparatus 10 which can be operated in accordance with the principles of the present invention to print a continuously moving low basis weight substrate 12 by means of a dual substrate, single-pass printing process that substantially eliminates ink buildup on the impression cylinder. The term "substrate" includes, but is not limited to, woven or nonwoven webs, porous films, ink permeable films, paper, or composite structures comprising a combination thereof. The term "low basis weight" refers to a substrate that has an inherent propensity for ink to strikethrough and cause ink buildup on the printing apparatus. A nonwoven substrate is considered a low basis weight substrate when its basis weight is equal to or less than about 20 grams per square meter. A nonwoven substrate having a basis weight greater than about 20 grams per square meter will be considered a higher basis weight substrate.

The term "pattern" when used with reference to ink printing herein, includes, but is not limited to, any type of design, mark, figure, identification code, graphic, word, image, or the like.

The present invention desirably utilizes a flexographic printing process to provide the proper balance of cost effectiveness, high speed, and high quality. The printing process is suitable for printing low basis weight substrates, such as low basis weight nonwoven webs, while maintaining the tactile softness of the substrates. Flexography is a printing technology utilizing flexible raised rubber or photopolymer plates to carry the pattern to a given substrate. The flexible plates typically carry a low viscosity ink directly onto the substrate. Examples of suitable low viscosity inks include inks comprising a non-catalytic block urethane resin and a solvent blend comprising up to about 50% by volume of acetate and up to about 75% by volume of glycol ether. The solvent blend also may comprise up to about 10% by volume of alcohol.

Suitable acetates include ethyl acetate, N-propyl acetate, N-butyl acetate, isopropyl acetate, isobutyl acetate, butyl acetate, and blends thereof.

Suitable glycol ethers include ethylene glycol monopropyl ether, ethylene glycol monobutyl ether, diethylene glycol monomethyl ether, diethylene glycol monopropyl ether, propylene glycol monomethyl ether, and blends thereof.

Suitable alcohols include ethyl alcohol, isopropyl alcohol, N-propyl alcohol, and blends thereof. A more detailed description of inks suitable for use with the present invention is contained in U.S. patent application Ser. No. 08/171,309, filed Dec. 20, 1993, which is assigned to the assignee of the present invention, the contents of which are incorporated by reference herein.

Various flexographic printing presses can be desirably used with the present invention, and two such designs include the central impression cylinder design and the stack-style design.

The types of plates that can be used with the flexographic process include plates identified as DuPont CYREL® HL, PQS, HOS, PLS, and LP, which may be commercially obtained from E. I. DuPont de Nemours and Company, Inc., of Wilmington, Del. Other suitable plates can be commercially obtained from BASF of Clifton, N.J., and from W. R. Grace and Company of Atlanta, Ga.

Although flexographic printing is desired, other printing apparatus are also contemplated by the present invention. These other printing apparatus include screen printing, rotogravure printing in which an engraved print roll is utilized, and ink jet printing in which nozzles spray ink droplets that are selectively deflected by an electrostatic charge to form the desired pattern on the substrate. It is desirable that the inks used with these apparatus have a viscosity equal to or less than about 10 centipoise.

The dual substrate, single-pass printing process of the present invention is a process that continuously prints low basis weight substrates. One feature of the present invention is that another substrate, also requiring ink patterns to be printed thereon, serves as the "back-up" material to substantially eliminate ink buildup on the printing apparatus. The other substrate desirably has a higher basis weight than the low basis weight substrate. By eliminating ink buildup, the present invention improves the quality of the printed pattern, and reduces the costs of manufacture.

Figure 3:
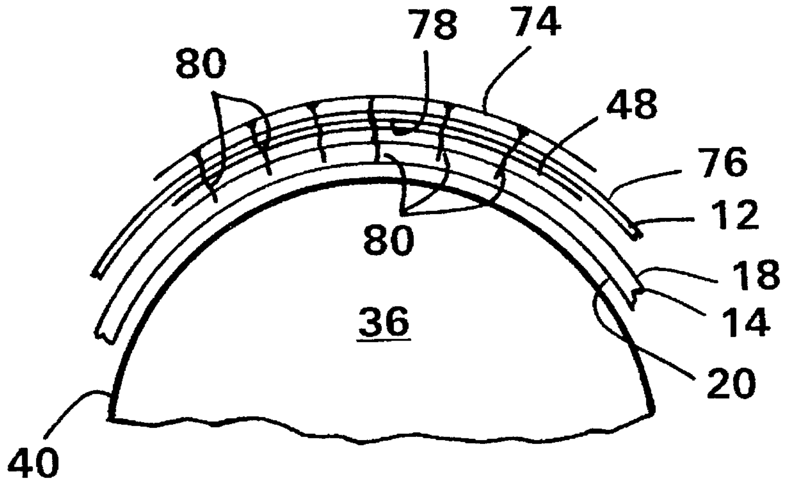
FIG. 3 illustrates a fragmentary, cross-sectional view through a portion of the central impression cylinder in FIG. 1.

Referring to FIGS. 1, 3, a continuously moving first, or higher basis weight, substrate 14 is supplied from a primary unwind 16. Substrate 14 includes a printing surface 18 (FIG. 3) and an opposed inner surface 20. Substrate 14 passes over a series of idler rollers 22, 24, 26, 30 to a primary steering section 32 that maintains proper lateral alignment of substrate 14 with a printing station 34, and more particularly with a rotatable central impression cylinder 36. A nip pressure roller 38 holds or maintains substrate 14 in contact with a surface 40 of rotatable central impression cylinder 36.

After nip pressure roller 38, substrate 14 is transported by central impression cylinder 36 to front ink printing cylinders 42, 44, 46, which print a first ink pattern 48 (FIG. 3) on printing surface 18. Central impression cylinder 36 can be rotated in any suitable manner well known in the art.

Although FIG. 1 illustrates three front ink printing cylinders 42, 44, 46, a greater or fewer number of printing cylinders can be used to print any desired pattern on printing surface 18.

Continuing to refer to FIG. 1, a secondary unwind 50 supplies a continuously moving second, or low basis weight, substrate 12 over an idler roller 52. The purpose of the idler rollers herein is to maintain substrates 12, 14 on a proper path through apparatus 10. Substrate 12 continues over idler rollers 56, 58, 60 to a secondary steering section 62 that maintains proper lateral alignment of substrate 12 with printing station 34.

From secondary steering section 62, low basis weight substrate 12 passes over an idler roller 64 and a nip-pressure roller 66 which maintains low basis weight substrate 12 in contact with the first substrate 14. As illustrated in FIG. 3, an ink pattern 74 is printed on printing surface 76 of low basis weight substrate 12 by back ink printing cylinders 68, 70, 72 (FIG. 1). Low basis weight substrate 12 also includes an opposed inner surface 78.

Another feature of the present invention is the introduction of low basis weight substrate 12 into printing station 34, such that it lies on top of first substrate 14. Any ink that penetrates or passes through the low basis weight substrate 12 will be collected by first substrate 14. This is illustrated in FIG. 3 in which ink pattern 74, after it has been printed on low basis weight substrate 12, has at least a portion thereof that passes or strikes through low basis weight substrate 12 as a plurality of ink strikethroughs 80. Because first substrate 14 is between low basis weight substrate 12 and surface 40 of central impression cylinder 36, substrate 14 collects and absorbs ink strikethroughs 80, thereby eliminating ink buildup on surface 40 of central impression cylinder 36. This is important to the present invention in improving print quality and minimizing costs associated with printing, as earlier explained.

Another feature of the present invention is the registering of an ink pattern 74 with a substantially identical ink pattern 48. Whether the patterns are of one color or multi-colors, the ink striking through low basis weight substrate 12 will be collected or absorbed at the same color location in ink pattern 48 of the first substrate 14. This eliminates any "ghost patterns" on printing surface 18 of first substrate 14. This registration is accomplished by the mechanical linkage or electromechanical control of the relative positions of the printing cylinders. This type of registration is well known in the printing industry. One type of registration system can be commercially obtained from Hurletron, Inc. of Danville, Ill.

After moving past back ink printing cylinder 72, substrates 12 and 14 are separated from each other with substrate 14 passing through a primary tunnel 82. Within primary tunnel 82, substrate 14 is subjected to a temperature and airflow suitable for drying substrate 14 and the ink printed thereon.

Alternatively, tunnel 82 can be a radiation curing unit to be used in conjunction with radiation curable inks. Examples of radiation curing methods include ultraviolet curing, electron beam curing, infrared curing, and the like.

After exiting primary tunnel 82, substrate 14 continues through primary chill rollers 84 that cool substrate 14 to reduce the substrate temperature to ambient.

Thereafter, substrate 14 passes over a series of idler rollers 86, 88, 90, 92 to be rewound by a primary rewind 93 for subsequent transport and handling.

Similarly, low basis weight substrate 12 passes through a secondary tunnel 94, through secondary chill rollers 96, and over a series of idler rollers 98, 100, 102, 104 to be rewound by a secondary rewind 106 for subsequent transport and handling. Tunnel 94 can effect a suitable temperature and airflow, or radiation curing method, on substrate 12.

As thus described, the present invention provides for the ink printing of patterns on at least two substrates, in which one of the substrates is so porous, i.e., low basis weight, that ink printed thereon can strikethrough. The process of the present invention collects the ink strikethrough on the underlying substrate. The two substrates 12, 14 are thus printed in a single-pass through printing station 34.

Figure 2:
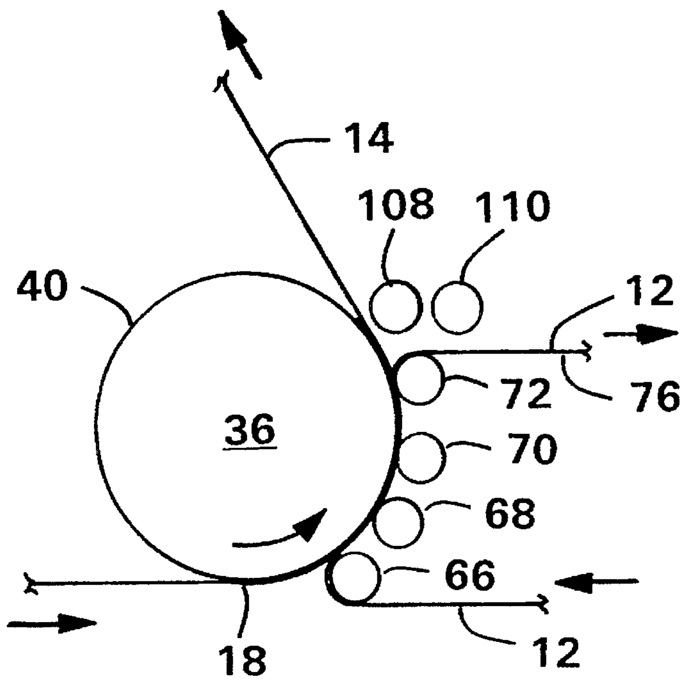
FIG. 2 illustrates a modification to the apparatus of FIG. 1.

Referring to FIG. 2, there is illustrated a modification of the apparatus in FIG. 1. In FIG. 2, at the point of separation of substrates 12 and 14, a primary application station 108 applies a suitable liquid, such as a lacquer, to substrate 14, and a secondary application station 110 applies a suitable liquid, such as a lacquer, to substrate 12. The lacquers, for example, serve to protect or preserve the respective ink patterns. Other liquids can be applied to serve other desired purposes.

Apparatus 10 can be operated within an optimum speed range which is desirably between about 500 to about 2000 feet per minute, and can be operated for an extended period of time since shutdowns caused by ink buildup are eliminated. Although not illustrated, tension on substrates 12, 14 can be controlled by electro-pneumatic dancer rolls or transducer rollers with feedback to speed control devices, as is well known in the art.

As described earlier, each substrate can be a woven or nonwoven web or fabric, and desirably can be a polyolefin-based web. Polyolefin-based webs include, but are not limited to, woven materials, nonwoven materials, knits, and porous films which employ polyolefin-based polymers. Examples of such polyolefins are polypropylene and polyethylene, including low density, high density, and linear low density polyethylene. It should be appreciated, however, that the present invention is not limited to these types of polyolefins, but embraces all types of polymers, copolymers, and natural fibers. In woven material applications, these materials can be made into continuous fibers, which are in turn woven into a fabric. In nonwoven applications, the fibers may be long, generally continuous fibers, such as spunbond fibers, or they may be shorter staple length fibers, such as are commonly used in carded webs. The fibers may also be meltblown to form the desired web. Such polymers or copolymers may be extruded, cast, or blown into films for subsequent use according to the present invention. Other nonwovens suitable for use with the present invention include airlaid, wet laid, solution spun fiber webs, or the like.

Fibers used in accordance with the present invention can be "straight" fibers in that they have the same general polymer or copolymer composition throughout. The fibers may also be multipolymer or multicomponent fibers, such as bicomponent fibers in which at least one component is a polyolefin, such as a polyolefin sheath and a polypropylene core fiber or a polyethylene sheath and a polyester core fiber. In addition to sheath/core fiber configurations, other examples of suitable fiber cross-sections are side-by-side, sea-in-islands, and eccentric fiber configurations. Furthermore, fibers with non-circular cross-sections such as "Y" and "X" shapes may be used.

The fibers and/or webs may have other components and/or treatments. For example, adhesives, waxes, flow modifiers, processing aids, and other additives may be used during the formation of the fibers or webs. In addition, pigments may be added to the fibers to change their color and other additives may be incorporated into the compositions to make the fibers or webs elastic. Lastly, blends of fibers, as well as straight and bicomponent fibers, may be combined to form nonwoven or woven webs suitable for use with the present invention.

The printed substrate can be used by itself, or in a multilayer configuration such as a laminate of one or more film and/or woven and/or nonwoven layers. Examples of such multilayer configurations include film/nonwoven laminates, or nonwoven/nonwoven laminates such as a spunbond/meltblown/spunbond three-layer laminate. By using such multilayer configurations, a variety of properties can be imparted to the laminate including breathability and/or liquid imperviousness.

When forming a nonwoven, such as a nonwoven polyolefin fibrous web, the fiber size and basis weight of the material can be varied according to the particular end use. In personal care products and medical fabric usage, typical fiber sizes will range from between about 0.1 to about 10 denier.

While this invention has been described as having a preferred embodiment, it will be understood that it is capable of further modification. This application is thereby intended to cover any variations, equivalents, uses, or adaptations of the invention following the general principles thereof, and including such departures from the present disclosure as come or may come within known or customary practice in the art to which this invention pertains and fall within the limits of the appended claims.

What is claimed is:

1. A printed substrate made by the process comprising:

providing a continuously moving first substrate, moving the first substrate to an ink printing station comprising at least two ink printing cylinders, printing a pattern on the first substrate with one of the two ink printing cylinders, then introducing a continuously moving second substrate between the first substrate and the other of the ink printing cylinders, printing a pattern on the second substrate with the other of the ink printing cylinders, and collecting ink striking through the second substrate onto the first substrate.

2. The substrate of claim 1 further comprising registering the pattern of the first substrate and the pattern of the second substrate.

3. The substrate of claim 1 further comprising drying the substrates.

4. The substrate of claim 1 further comprising cooling the substrates.

5. The substrate of claim 1 further comprising radiation curing the substrates.

6. The substrate of claim 1 further comprising separating the first substrate and the second substrate after the patterns have been printed.

7. The substrate of claim 6 further comprising separately drying the substrates.

8. The substrate of claim 6 further comprising separately cooling the substrates.

9. The substrate of claim 6 further comprising separately radiation curing the substrates.

10. The substrate of claim 1 wherein the printing is flexographic printing.

11. The substrate of claim 1 wherein the printing is rotogravure printing.

12. The substrate of claim 1 wherein the printing is ink-jet printing.

13. The substrate of claim 1 wherein the second substrate has a basis weight equal to or less than about 20 grams per square meter.

* * * * *